(12) United States Patent
Pichik

(10) Patent No.: US 11,337,418 B2
(45) Date of Patent: May 24, 2022

(54) RETRACTABLE BLIND ASSEMBLY

(71) Applicant: Marc D Pichik, Dubuque, IA (US)

(72) Inventor: Marc D Pichik, Dubuque, IA (US)

( * ) Notice: Subject to any disclaimer, the term of this patent is extended or adjusted under 35 U.S.C. 154(b) by 0 days.

(21) Appl. No.: 17/024,984

(22) Filed: Sep. 18, 2020

(65) Prior Publication Data
US 2021/0000101 A1     Jan. 7, 2021

Related U.S. Application Data

(63) Continuation-in-part of application No. 14/991,924, filed on Jan. 9, 2016, now abandoned.

(51) Int. Cl.
*A01M 31/00*     (2006.01)
*A01M 31/02*     (2006.01)
*E04H 15/00*     (2006.01)

(52) U.S. Cl.
CPC ......... *A01M 31/025* (2013.01); *E04H 15/001* (2013.01)

(58) Field of Classification Search
CPC ....... A01M 31/00; A01M 31/025; E06B 9/08; E06B 9/40; E06B 9/42; E06B 9/18; E06B 2009/405; E04H 15/00; E04H 17/00; E04H 15/001; E01F 13/028; E01F 13/02; E01F 13/00; E04F 10/06; E04F 10/0633; E04F 10/0644; E04F 10/0648; E04F 10/0655; E04F 10/0685
USPC ............ 43/1; 135/901; 160/23.1, 24, 25, 26, 160/120, 121.1, 122, 903
See application file for complete search history.

(56) References Cited

U.S. PATENT DOCUMENTS

| | | | | |
|---|---|---|---|---|
| 376,436 | A * | 1/1888 | Harrison | G03B 21/58 160/24 |
| 2,771,088 | A * | 11/1956 | Soldan | E04H 15/003 135/904 |
| 2,886,047 | A * | 5/1959 | Healy | E04H 15/003 135/904 |
| 4,124,196 | A * | 11/1978 | Hipskind | E01F 7/00 116/63 P |
| 4,195,370 | A * | 4/1980 | Budd | E04H 4/101 4/502 |
| 5,062,234 | A * | 11/1991 | Green | A01M 31/025 135/901 |
| 5,685,354 | A * | 11/1997 | Kim | B60J 1/2063 160/122 |
| 6,662,849 | B1 * | 12/2003 | Hsiung | B60J 11/02 160/370.21 |
| 6,733,204 | B1 * | 5/2004 | Paniccia | E01F 7/06 160/238 |

(Continued)

*Primary Examiner* — Darren W Ark

(57) ABSTRACT

A blind assembly and setup configurations for the blind assembly are disclosed. The blind assembly contains two sheets wound together into a roll that are configured for separate outstretching at an angle relative to each other, for being maintained under tension in an outstretched form, and for retraction back into the roll. The end of each sheet contains a handle rod used for handling the sheets and for anchoring to the ground by means of attaching to stakes inserted into the ground using ropes. The roll end of the assembly structure is likewise attached to a stake in the course of setting up the blind assembly. A tie rod provides added support for the structure and is set up at a distance from the sheet rolls to prevent uncontrolled wraparounds of the sheets when the sheets are retracted.

21 Claims, 7 Drawing Sheets

(56) References Cited

U.S. PATENT DOCUMENTS

| | | | | |
|---|---|---|---|---|
| 6,779,537 | B1* | 8/2004 | Miller | E04H 15/001 |
| | | | | 135/117 |
| 6,948,542 | B2* | 9/2005 | Abouloukme | E06B 9/40 |
| | | | | 160/122 |
| 7,219,709 | B1* | 5/2007 | Williams | E01F 13/028 |
| | | | | 160/24 |
| 8,579,007 | B2* | 11/2013 | Pottmeyer | A01M 31/025 |
| | | | | 160/351 |
| 8,881,787 | B2* | 11/2014 | Wang | E06B 11/04 |
| | | | | 160/24 |
| 9,598,896 | B1* | 3/2017 | Pichik | E06B 9/60 |
| 10,718,130 | B2* | 7/2020 | Thayer | E04H 15/005 |
| 10,722,021 | B2* | 7/2020 | Fant | E04H 15/30 |
| 2003/0164485 | A1* | 9/2003 | Olson | B21F 33/002 |
| | | | | 256/37 |
| 2005/0241779 | A1* | 11/2005 | Abouloukme | E06B 9/64 |
| | | | | 160/122 |
| 2007/0228349 | A1* | 10/2007 | Smith | E01F 13/028 |
| | | | | 160/122 |
| 2017/0159289 | A1* | 6/2017 | Strong | E04B 2/76 |
| 2018/0334829 | A1* | 11/2018 | Thayer | E04H 15/005 |
| 2019/0239627 | A1* | 8/2019 | Fant | E04H 15/001 |

* cited by examiner

RETRACTABLE BLIND ASSEMBLY

RELATED APPLICATIONS

This continuation in part patent application claims priority from patent application Ser. No. 14/991,924 filed on Jan. 9, 2016.

FIELD OF THE INVENTION

The present invention relates to embodiments of a blind assembly for outdoor uses and embodiments for setting up and utilizing the blind assembly.

BACKGROUND OF THE INVENTION

Hunters often use camouflages in hunting fields to conceal their presence from animals that may run away if they are detected. It would, therefore, be desirable to construct a camouflage or blind in a way that allows quick assembly, quick setup and quick disassembly.

SUMMARY OF THE PRESENT INVENTION

It is an object of the present invention to provide a hunting blind for camouflaging a hunter that a hunter could set up and quickly in the field, take down and carry with via a shoulder strap.

In one aspect of the present invention, a retractable blind assembly comprises a reel tube having a top end and a bottom end; a first sheet and a second sheet, the first sheet joining the second sheet to form a combined sheet having a rear end and a front end, the combined sheet being wound over the reel tube to form a sheet roll with the rear end of the combined sheet being disposed inside the roll to form a retracted configuration, the first sheet and second sheet being configured for unwinding from the sheet roll separately to form an outstretched blind at an angle, the first sheet having a front end and the second sheet having a front end; a base housing adapted for placement onto a ground surface, the base housing containing a rear vertical extension and a front vertical extension, the bottom of the reel tube being adapted to fit onto the front vertical extension of the base frame; a tie rod having a top side and a bottom side, the bottom side being adapted for placement into the rear vertical extension of the base housing; a torsion spring adapted to tightly fit inside the reel tube, the torsion spring being adapted for applying tension onto the outstretched blind; and a housing assembly attached to the top of the sheet roll and the top of the tie rod.

These and other features, aspects and advantages of the present invention will become better understood with reference to the following drawings, description and claims.

DETAILED DESCRIPTION OF THE INVENTION

Figure 1:
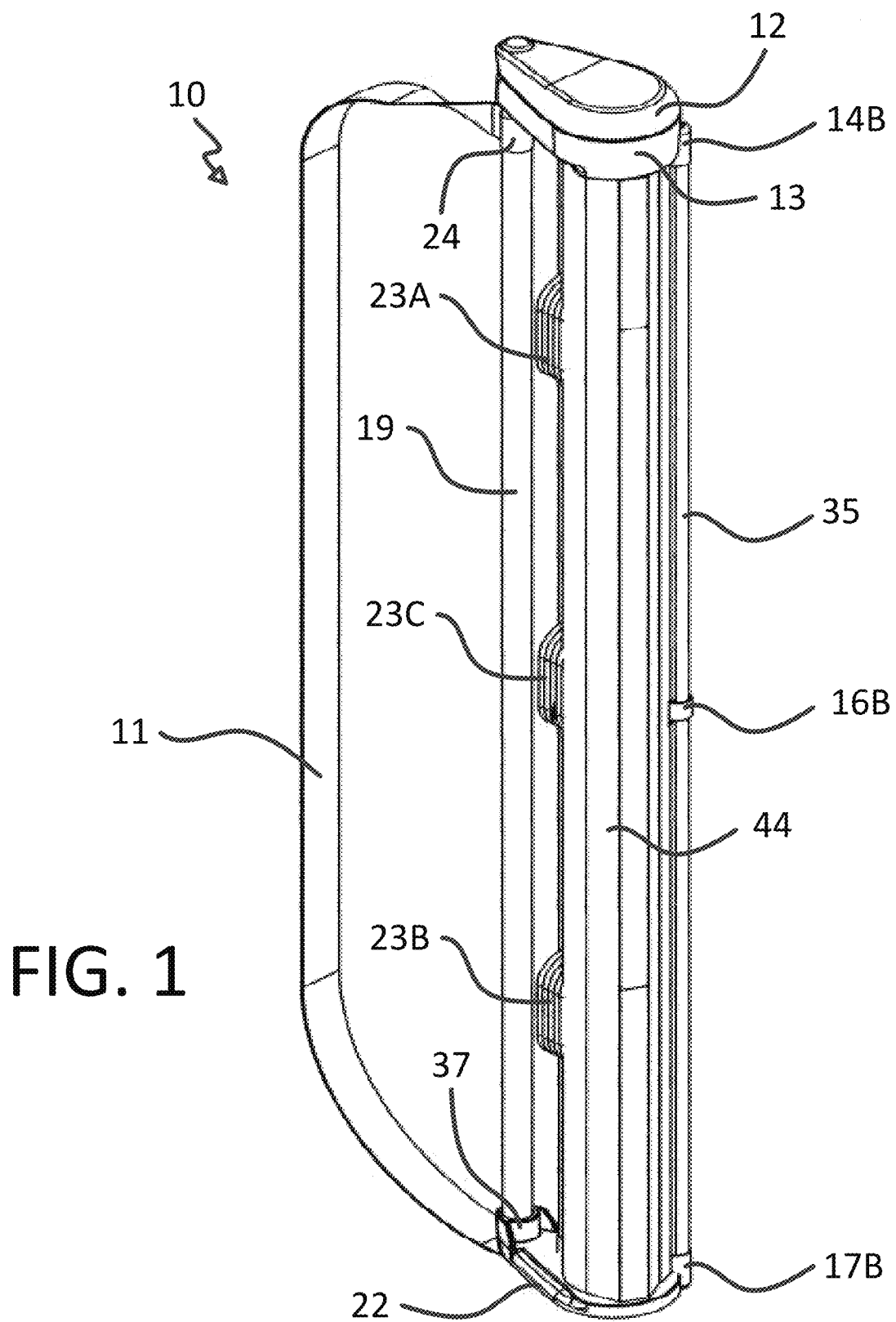
FIG. 1 portrays a perspective view of the assembly for outstretching and retracting a blind according to an embodiment of the present invention.
Figure 2:
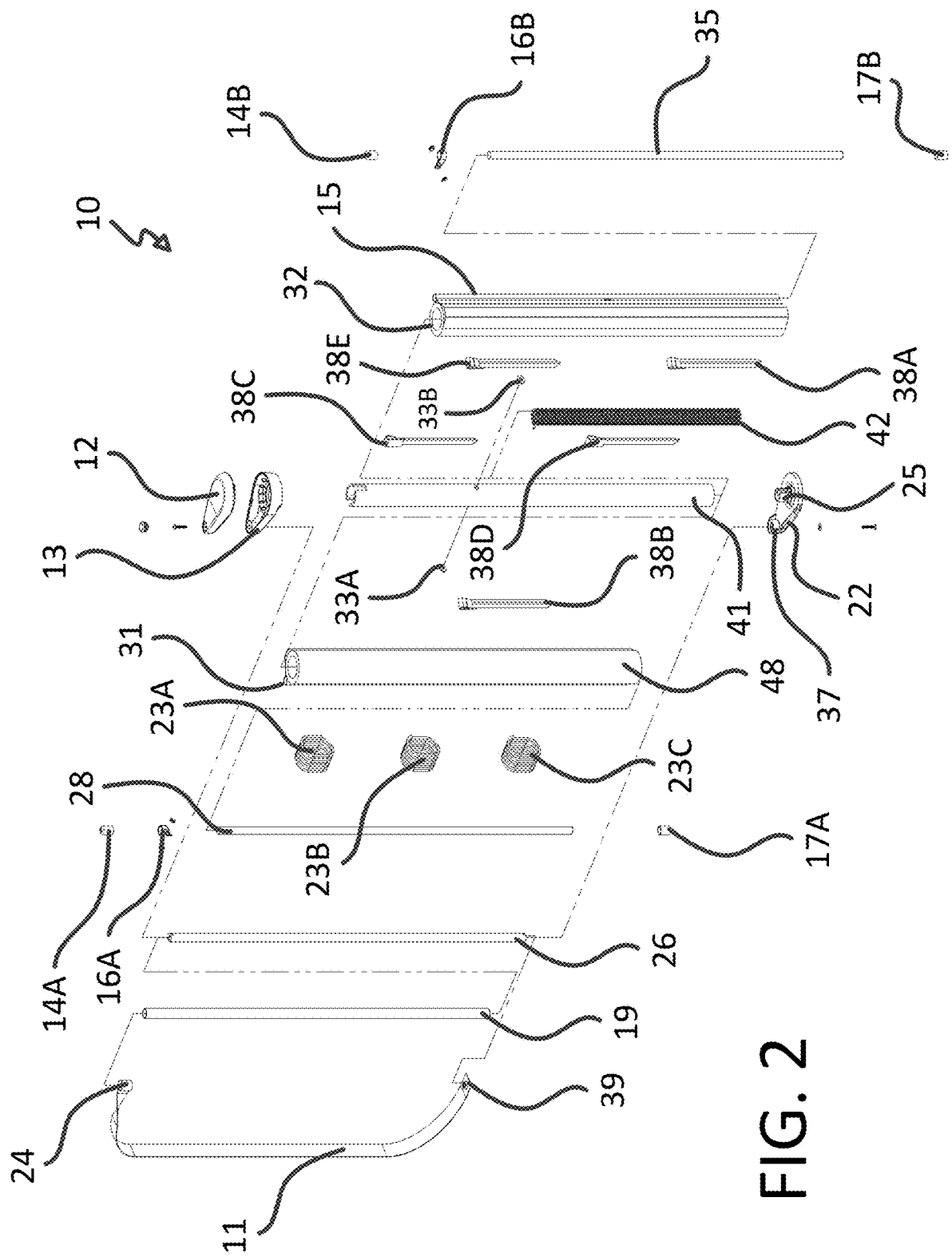
FIG. 2 presents an exploded view of the assembly for outstretching and retracting a blind according to an embodiment of the present invention.

The following detailed description is of the best currently contemplated modes of carrying out exemplary embodiments of the invention. The description is not to be taken in a limiting sense, but is made merely for the purpose of illustrating the general principles of the invention.

The assembly of the present invention contains two sheets wound into one roll. The sheets are configured for unwinding from the roll, for extending from the roll to form two blinds, and for retracting back into a roll form.

FIGS. 1-6 show the retractable blind assembly 10 and configurations of the assembly set up for use 20. The retractable blind assembly 10 comprises two sheets 43 and 44 wound into a roll 49. The sheet material of construction is preferably a flexible yet strong fabric. The mesh of the fabric may be open or closed. However, other materials of construction, such as metal or plastic, also fall within the scope of the present invention. In the construction of the assembly, two rolls 32 and 48 are wound into one roll 49. To construct roll 49, the back sides of sheets 43 and 44 are attached at their back edges and together are wound around reel tube 41. The front edge of each sheet 43 and 44 is attached respectively to rigid handle rods 28 and 35. The handle rods 28 and 35 may be attached to the front edges of sheets 43 and 44 through loop pockets 31 and 15 sewn into the sheet front edges; however, other attachment means also fall within the scope of the present invention.

Torsion spring roll 42 is inserted inside reel tube 41. The torsion spring roll applies tension onto combined sheets 43 and 44 when the user pulls out the sheets using the handle rods 28 and 35 to set up the blind assembly 10 in a hunting field.

The assembled retractable blind 10 shown in Figures is set vertically onto base housing 22 which is placed onto the ground in the field. The base housing 22 contains a hollow rear vertical extension 37 and a front vertical extension 25.

Figure 3:
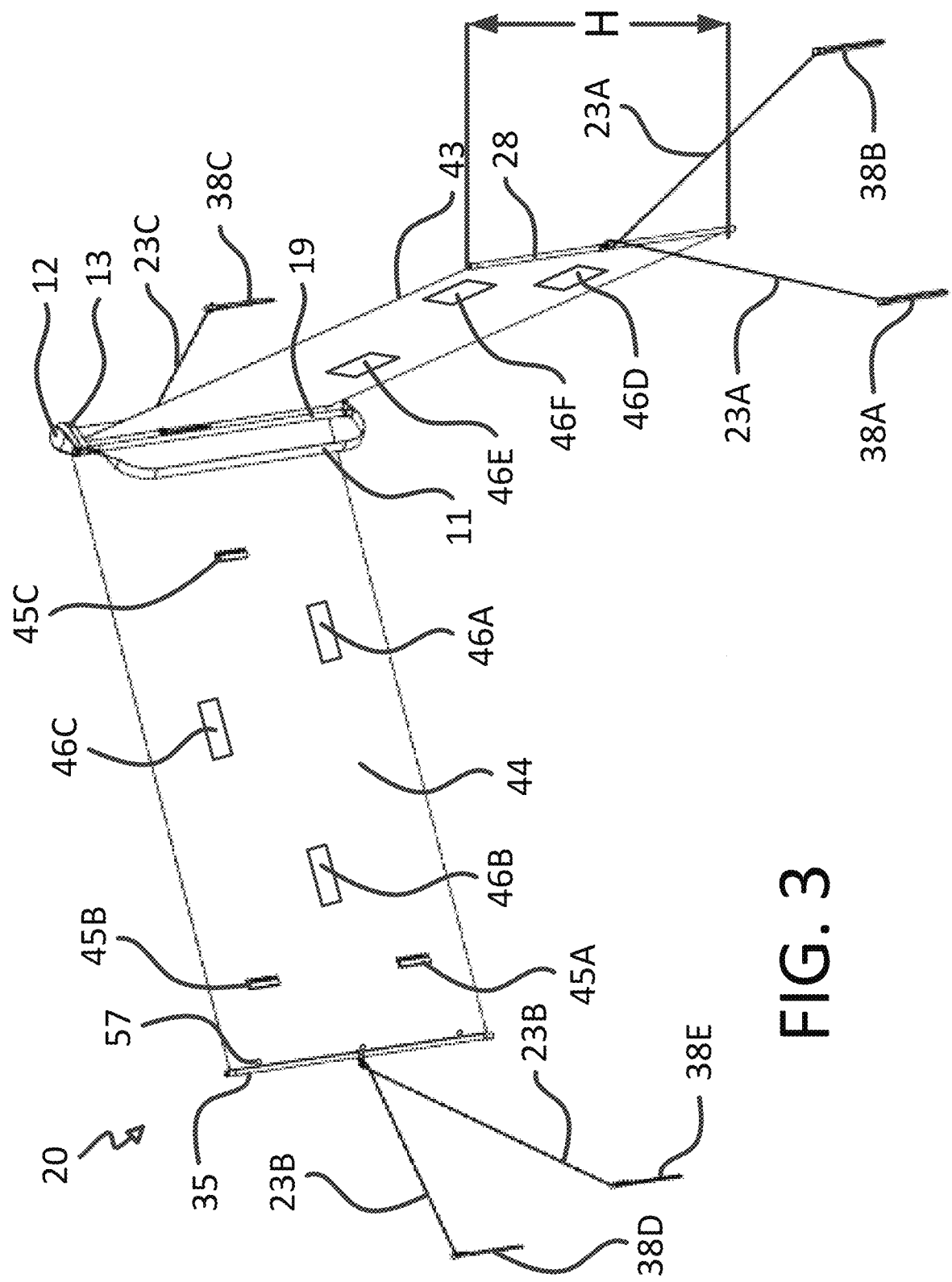
FIG. 3 is a perspective view of the assembly for outstretching and retracting a blind in a use configuration according to an embodiment of the present invention.

The blind assembly has varying uses ranging from camouflaging a hunter to providing privacy to groups of people in the back yard. For a hunter laying on the ground, a sheet height of 16 inches is sufficient while for a hunter in a standing position, the required sheet height could be as much as 96 inches. A typical sheet height range that provides an optimum balance between providing the widest use and material costs is from 34 inches and 72 inches. The height, H of the sheets is shown in FIG. 3.

Figure 4:
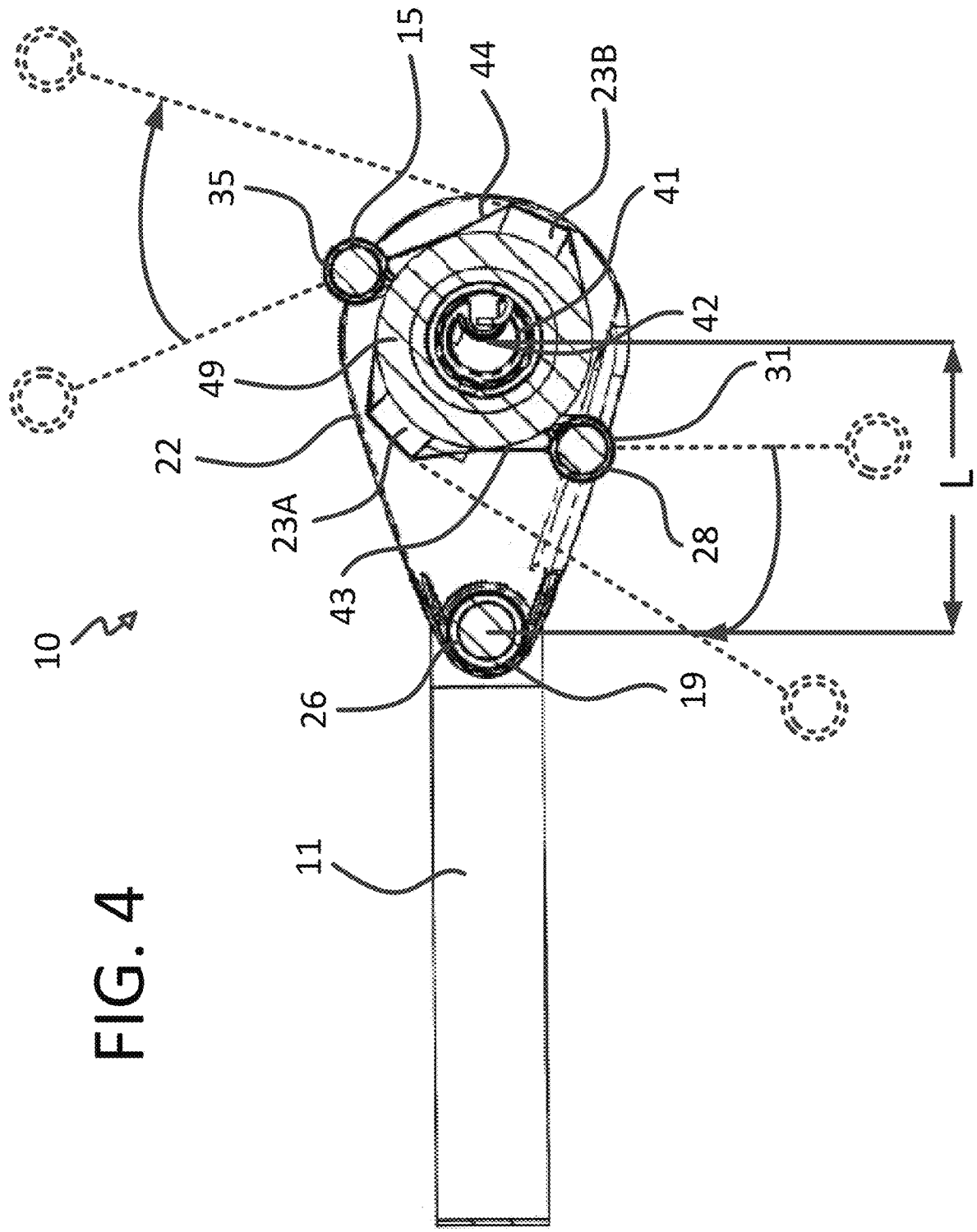
FIG. 4 shows a top cutaway view of the assembly for outstretching and retracting a blind according to an embodiment of the present invention.

The assembly 10 is subjected to forces exerted by the pulling out and retracting of the sheets. It is therefore important to construct the assembly 10 such that it is stable, that it would not come apart in use or collapse. A number of provisions are made to reinforce the structure. A tie rod 26 is inserted into rear vertical extension 37 of base housing 22 while the reel tube 41 is placed over front vertical extension 25 of base housing 22. Protective sleeve 19 slips over tie rod 26 to provide additional rigidity. A housing assembly comprised of middle housing 13 and upper housing 12 is attached to the top side of the tie rod 26 and to the reel tube 41 to keep the top of the assembly together. Additionally, the tie rod 26 helps prevent the sheets from excessively rewinding and wrapping around the rear of the device when the tension on the torsion spring roll 42 is released and the sheets 43 and 44 return to their retracted positions. This tends to take place when the sheets rewind in an uncontrolled manner and the angle between the sheets 43 and 44 is 90 degrees or less and the tie rod 26 is disposed between the sheets as shown in FIG. 4. The sheets may rewind in an uncontrolled manner in a situation when the user sets up the device in the field, then inadvertently lets go of a stretched-out sheet. Uncontrolled rewinding could lead to the sheets wrapping around the reel tube thus unwinding the preloaded spring tension and causing stowage, jamming, and other usage issues. To prevent this from taking place, the base housing, housing assembly, and handle rods are sized to help prevent wraparounds and the tie rod is spaced from the reel tube by 2 inches to about 12 inches depending on the angle between the sheets 43 and 44 and the height of the sheet. The spacing, L, is shown in FIG. 4. Generally, a larger spacing is necessary for shorter sheets and for a setup angle between the sheets of 90 degrees or less, while a smaller spacing is needed for the upper range of sheet heights and setup angles larger than 90 degrees. For typical sheet heights of between 34 and 72 inches, a spacing of 3 inches to about 7 inches between the tie rod and reel tube provides sufficient protection against wraparounds.

Also, the base housing 22 and the upper housing 12 provide a hard stop for the handle rods 28 and 35 when the sheets 43 and 44 retract. As can be seen in FIG. 1, upper cap 14B and lower cap 17B attached to the second handle rod butt up against the middle housing 13 and the base housing 22 respectively. It is noted that in FIG. 1 the handle rod is labeled as 15 for the loop pocket that covers it. This configuration helps prevent the possibility that the handle rods 28 and 35 slip in the space between the tie rod 26 and the reel tube 41.

Additional components used for reinforcing the assembly structure and/or help it function include: upper caps 14A and 14B and lower caps 17A and 17B placed onto handle rods 28 and 35 respectively, and clamps 16A and 16B that fasten onto the middle portions of the respective handle rods 28 and 35.

The caps 14A and 14B are placed over the top of their respective handle rods 28 and 35 and lower caps 17A and 17B are placed over the bottom of the handle rods 28 and 35. Caps 14A and 14B function as stops resting against middle housing 13 to prevent the fully rewound sheet from rewinding too far. Clamps 16A and 16B fasten around the loop pockets 31 and 15 and their respective handle rods 28 and 35 to prevent the handle rods 28 and 35 from sliding out of the loop pockets 31 and 15.

Strap 11 is attached to top of the tie rod sleeve 19 and tie rod 26 through sewn loop 24 and clip 39 fastened onto the bottom of base housing 22. The strap 11 is used for carrying around the blind assembly 10.

Stakes inserted into the ground and tied with ropes to the blind assembly are used for setting up the blind assembly 10 in a field to be used as camouflage for a hunter. FIG. 3 shows the set-up assembly in a ready to use configuration 20. Stakes 38A and 38B are attached to handle rod 28 using tie back rope 23A, stakes 38D and 38E are attached to handle rod 35 using tie back rope 23B, and stake 38C is attached to reel tube 41 through tie back rope 23C. In an assembled state, the ropes 23A, 23B and 23C are coiled up and stowed along with stakes 38A-38E in pockets 45A, 45B and 45C disposed on sheet 44. Pockets 45A and 45B are located near handle rod 35 and contain the stakes and ropes used for tying the handle rods while pocket 45C is located in the vicinity of the real tube 41 and stows the rope and stake for the reel tube 41.

Figure 7:
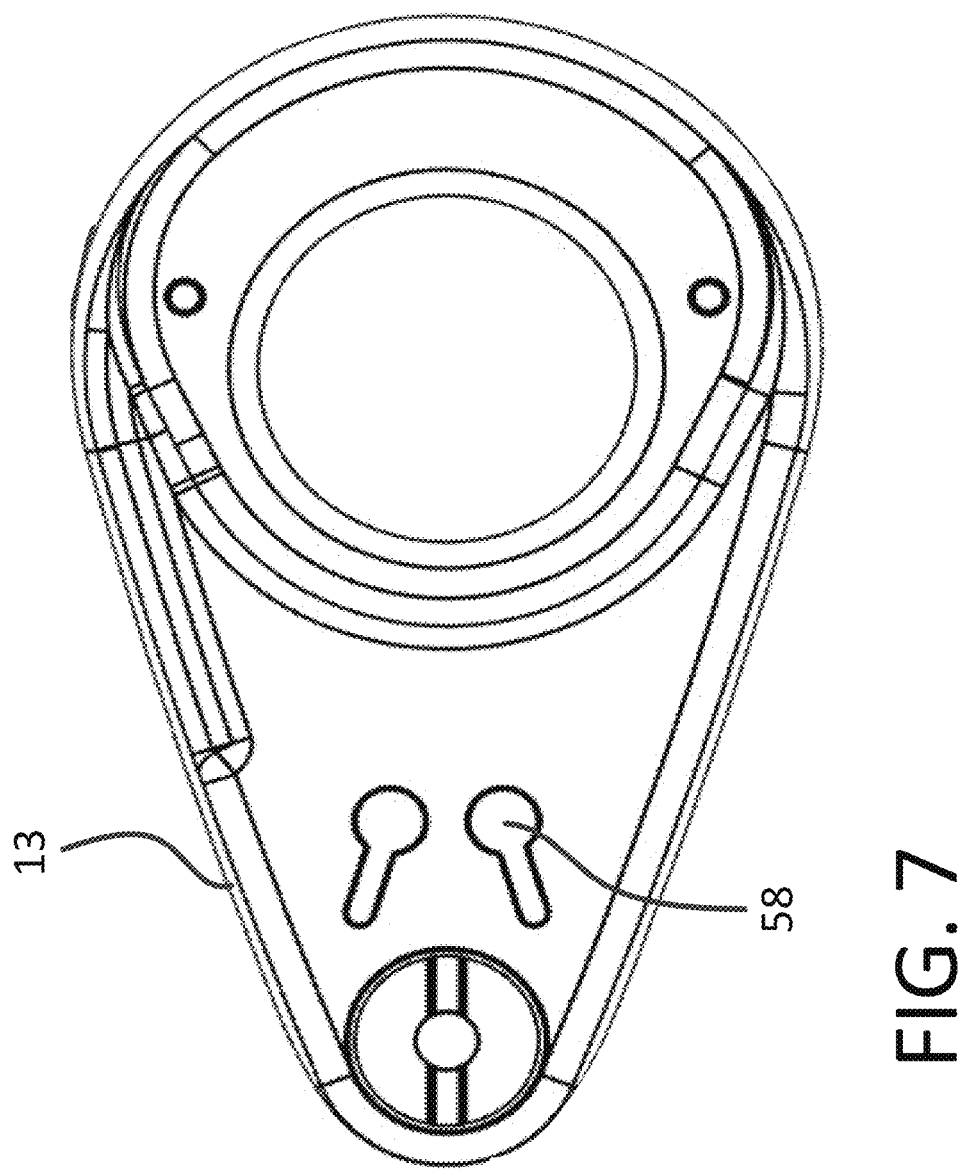
FIG. 7 highlights a claimed feature of the assembly for outstretching and retracting a blind according to an embodiment of the present invention.

Securing the tie back ropes 23A and 23B to the handle rods 28 and 35 is done through grommet holes 57 disposed in the fabric loops 15 and 31 behind handle rods 35 and 28 respectively as shown in FIG. 3. Securing the tie back rope 23C is done through an opening in reel tube 41 using washers 33A and 33B fastened to the sides of the opening and knots tied on either side of the washers to keep the rope end from pulling through the reel tube opening. In an alternative embodiment, the rope having a knot at the attaching end is wedged into a key slot opening 58 disposed at the bottom of the middle housing 13 as shown in FIG. 7.

The sheets 43 and 44 may have camouflage designs printed on their surfaces to help conceal the hunter. The sheets 43 and 44 may also contain look out flaps shown by 46A, 46B and 46C in FIG. 3 for the hunter to peek through.

Figure 5:
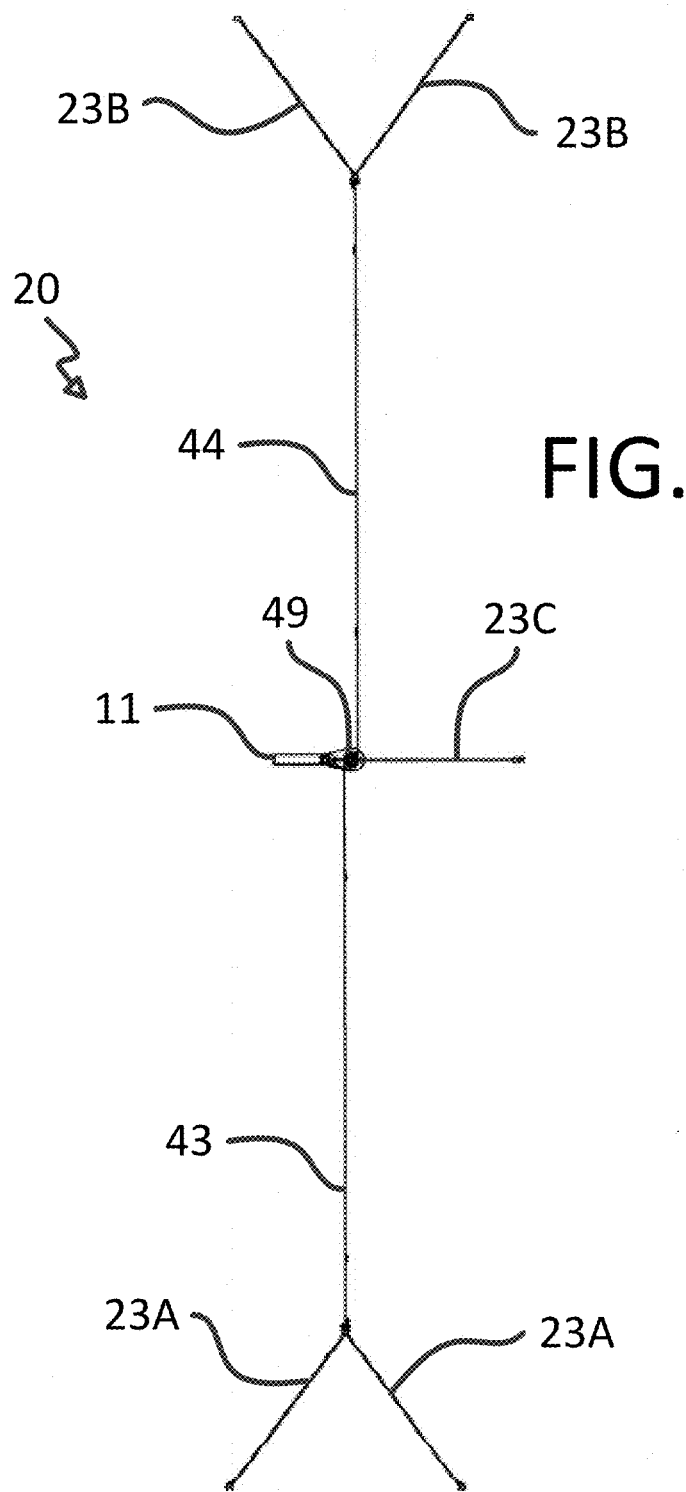
FIG. 5 is a top cutaway view of the assembly for outstretching and retracting a blind in a use configuration according to an embodiment of the present invention.
Figure 6:
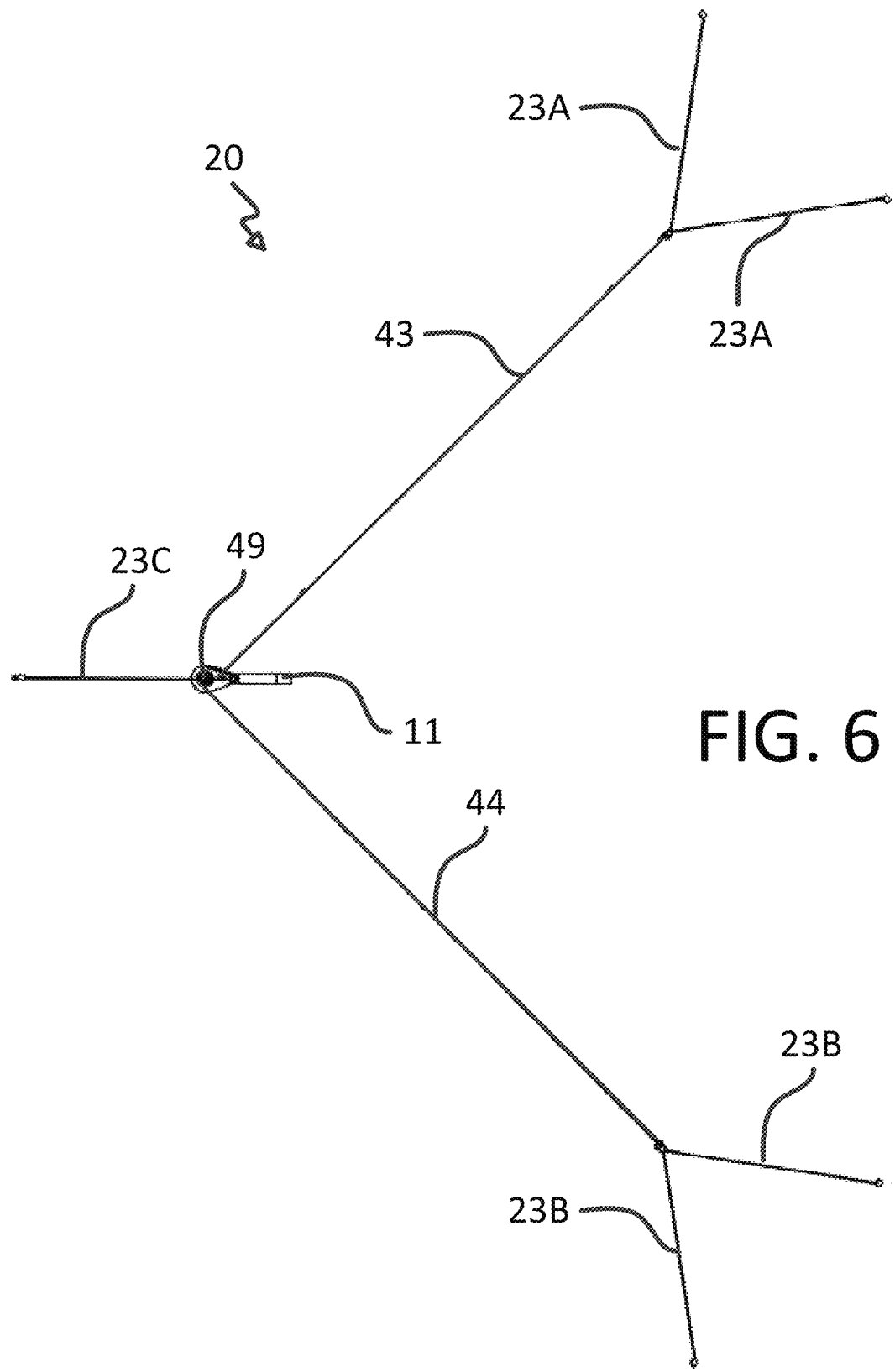
FIG. 6 is a top cutaway view of the assembly for outstretching and retracting a blind in another use configuration according to an embodiment of the present invention.

In a typical setup, the angle between the outstretched sheets 43 and 44 is 90 degrees as shown in FIGS. 3 and 6. The angle between the sheets may be changed at the discretion of the hunter to between 0.0 and 180 degrees. Angle adjustment may be accomplished as shown in FIG. 4. FIG. 5 shows a 180-degree angle setup. In practical terms, the hunter would set the setup angle that gives him/her the best camouflage given the topography of the area.

To set up the blind assembly, one of the handle rods would be attached to stakes inserted into the ground as the first step. The strap end would then be pulled out which would outstretch the anchored sheet while the other handle rod and sheet would temporarily flop down. Next, the reel tube end would be attached by rope 23C to stake 38C and finally the other handle rod would be attached by rope to its corresponding stakes.

It should be understood, of course, that the foregoing relates to exemplary embodiments of the invention and that modifications may be made without departing from the spirit and scope of the invention.

I claim:
1. A retractable blind assembly comprising:
a reel tube having a top end and a bottom end;
a first sheet and a second sheet, each of said first sheet and said second sheet having a back edge and a front edge, said first sheet joining the second sheet at the back edges thereof to form a combined sheet, said combined sheet being wound over the reel tube to form a sheet roll with the back edges of the first and second sheets being disposed inside the sheet roll to form a retracted configuration of the retractable blind assembly, said first sheet and second sheet being configured for unwinding from the sheet roll separately to form an outstretched blind such that the first sheet and second sheet extend from the reel tube at an angle with respect to each other in a use configuration of the retractable blind assembly;
a base housing adapted for placement onto a ground surface, said base housing comprising a rear vertical extension and a front vertical extension, said bottom end of the reel tube being fitted onto the front vertical extension of the base housing;

a tie rod having a top side and a bottom side, said bottom side being placed into the rear vertical extension of the base housing;

a torsion spring fitted inside the reel tube, said torsion spring being adapted for applying tension onto the outstretched blind in the use configuration of the retractable blind assembly; and a housing assembly attached to a top of the sheet roll and the top side of the tie rod.

2. The retractable blind assembly of claim 1 further comprising a first handle rod being attached to the front edge of the first sheet and a second handle rod being attached to the front edge of the second sheet.

3. The retractable blind assembly of claim 2 wherein attachment of the first handle rod to the front edge of the first sheet and of the second handle rod to the front edge of the second sheet is accomplished by insertion of said handle rods into looped pockets sewn to the front edges of the respective first and second sheets.

4. The retractable blind assembly of claim 3 further comprising a first clamp fastened onto the looped pocket into which the first handle rod is inserted and a second clamp fastened onto the looped pocket into which the second handle rod is inserted so as to prevent the handle rods from sliding out of the respective looped pockets.

5. The retractable blind assembly of claim 4, further comprising a first grommet hole disposed in the looped pocket into which the first handle rod is inserted and a second grommet hole disposed in the looped pocket into which the second handle rod is inserted for attaching tie back ropes thereto.

6. The retractable blind assembly of claim 2 further comprising a sleeve adapted to Slide over the tie rod to reinforce the tie rod.

7. The retractable blind assembly of claim 6, further comprising a strap attached at one end thereof to a top of the sleeve adapted to slide over the tie rod and at another end thereof to a bottom of the base housing.

8. The retractable blind assembly of claim 2 further comprising a cap attached to a bottom side of the first handle rod, said first handle rod and the cap attached to the bottom side of the first handle rod being configured to extend downwardly to contact the base housing in the retracted configuration of the retractable blind assembly in a manner that the base housing blocks the first handle rod from passing through a space between the reel tube and the tie rod when the first handle rod retracts.

9. The retractable blind assembly of claim 2 further comprising a cap attached to a bottom side of the second handle rod, said second handle rod and the cap attached to the bottom side of the second handle rod being configured to extend downwardly to contact the base housing in the retracted configuration of the retractable blind assembly in such a manner that the base housing blocks the second handle rod from passing through a space between the reel tube and the tie rod when the second handle rod retracts.

10. The retractable blind assembly of claim 1 wherein the housing assembly comprises a middle housing attached at one end thereof to the top side of the tie rod, said housing assembly also comprising an upper housing for covering the middle housing.

11. The retractable blind assembly of claim 10 further comprising a slot disposed at a bottom of the middle housing for wedging a knot of a tie back rope used for attaching the assembly during assembly setup.

12. The retractable blind assembly of claim 10 further comprising a cap attached to a top side of the first handle rod, said first handle rod and the cap attached to the top side of the first handle rod being configured to extend upwardly to contact the middle housing in the retracted configuration of the retractable blind assembly in such a manner that the middle housing blocks the first handle rod from passing through a space between the reel tube and the tie rod when the first handle rod retracts.

13. The retractable blind assembly of claim 10 further comprising a cap attached to a top side of the second handle rod, said second handle rod and the cap attached to the top side of the second handle rod being configured to extend upwardly to contact the middle housing in the retracted configuration of the retractable blind assembly in such a manner that the middle housing blocks the first handle rod from passing through a space between the reel tube and the tie rod when the second handle rod retracts.

14. The retractable blind assembly of claim 1 further comprising a plurality of tie back ropes and a plurality of stakes used for setting up the retractable blind assembly, said stakes and ropes being stowed inside pockets disposed on a surface of the first or second sheet.

15. The retractable blind assembly of claim 1 further comprising a plurality of look out flaps in the first and second sheets fora hunter to peek through.

16. The retractable blind assembly of claim 1 further comprising a hole in a center portion of the reel tube for sliding through a tie back rope used for attaching the assembly during assembly setup.

17. The retractable blind assembly of claim 1 further comprising camouflaged designs printed onto an outer side of the first and second sheets.

18. The retractable blind assembly of claim 17 further comprising camouflaged designs printed onto an inner side of the first and second sheets.

19. The retractable blind assembly of claim 1 wherein the angle at which the first sheet and second sheet extend with respect to each other from the reel tube of the outstretched blind may vary from about 0.0 to about 180 degrees.

20. The retractable blind assembly of claim 19 wherein the tie rod is disposed at a distance from the reel tube such that it prevents the first sheet or the second sheet from wrapping around a rear of the retractable blind assembly when the sheets retract in an uncontrolled manner and when a setup angle between the first sheet and the second sheet is 90 degrees or less with the sheets oriented such that the tie rod is disposed between the sheets.

21. The retractable blind assembly of claim 1 wherein the tie rod is configured to stop pivoting of the base assembly and housing assembly, said pivoting being actuated by the torsion spring wherein stopping the pivoting is accomplished by one of the sheets blocking movement of the tie rod.

* * * * *